July 7, 1936.   F. W. LYLE   2,046,692
ELECTRICAL SYSTEM
Filed Jan. 23, 1930
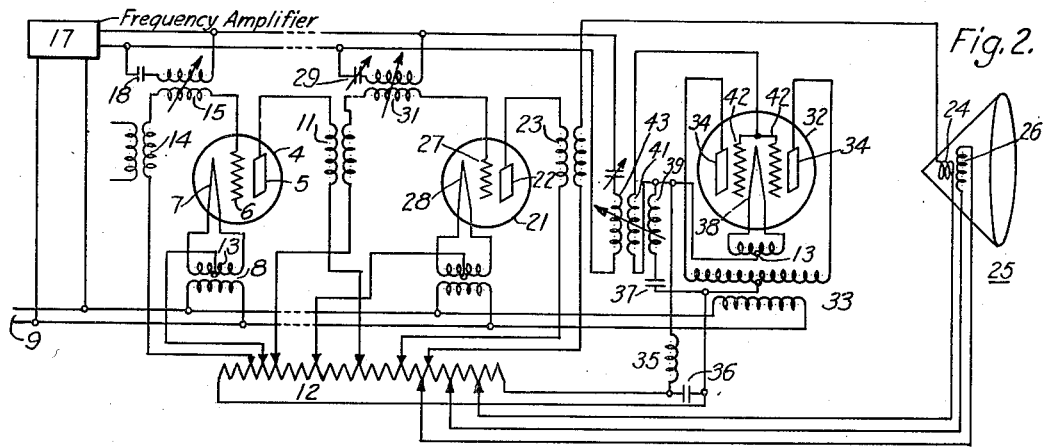
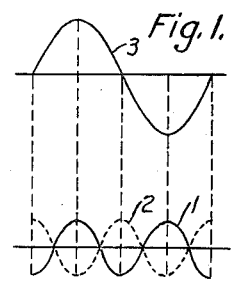
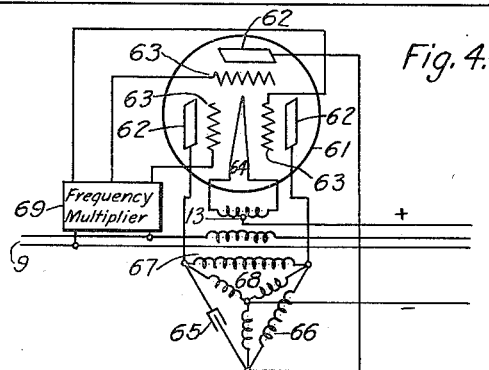
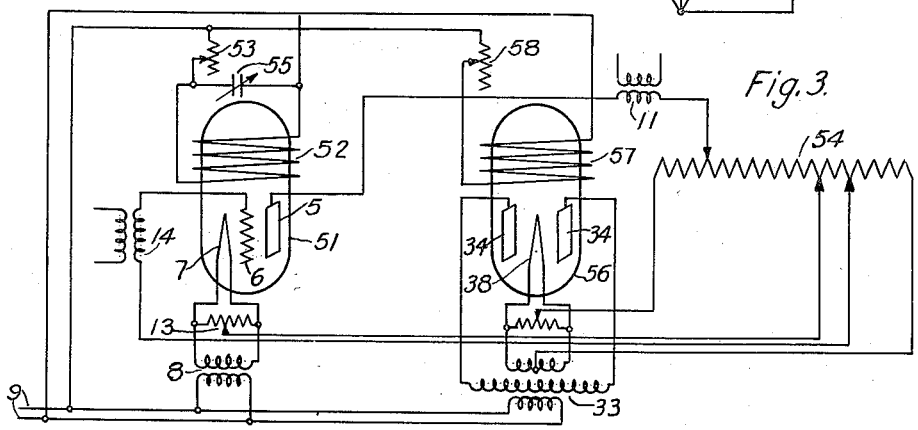
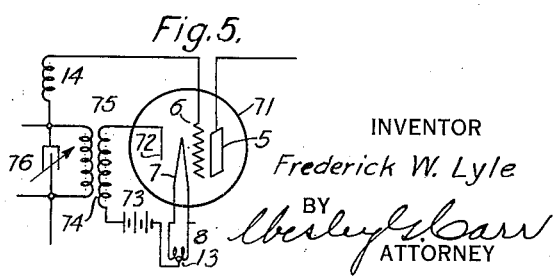
INVENTOR
Frederick W. Lyle
BY
ATTORNEY Patented July 7, 1936

2,046,692

UNITED STATES PATENT OFFICE 2,046,692

ELECTRICAL SYSTEM

Frederick W. Lyle, Wilkinsburg, Pa., assignor to Westinghouse Electric & Manufacturing Company, a corporation of Pennsylvania Application January 23, 1930, Serial No. 422,927

16 Claims. (Cl. 250—27)

My invention relates to electrical rectifier, oscillator and amplifier systems and particularly to systems in which electrical-discharge devices, embodied therein, are supplied with current from alternating-current sources.

In electrical systems employed to amplify or reproduce variable electrical currents, it is desirable that arrangements shall be such that the output current will vary only as the input quantity varies; in other words, wherever the input quantity remains invariable over a given time interval, the output current will likewise be constant and invariable. When three-electrode tubes provided with heated cathodes are embodied in such systems, the foregoing conditions are satisfactorily met if the source of current for the output circuit and the source of current for heating the cathode are constant-voltage direct-current sources, such as ordinary batteries. However, it would frequently be cheaper and more convenient if the alternating-current house-lighting supply, instead of the batteries, could be utilized to supply current, but, to do so, arrangements must be devised to prevent the periodic variations of the alternating-current source from producing variations in the output circuit of the system.

As respects the source of current for the output circuit, double-wave rectifiers having filters provide a partially satisfactory solution of the problem under discussion, but, unless the filters are relatively large and expensive, a substantial ripple of second-harmonic frequency of the alternating-current supply is produced in the output current. The employment of alternating current to heat the cathodes results in the production of a ripple, also of second harmonic frequency of the alternating-current supply, in the output circuit. Various means have been devised for minimizing this ripple; but its complete avoidance is prohibitively difficult and expensive in practice. One principal object of my invention is to provide circuit arrangements which produce constant and invariable currents in the output circuits of systems of the kind described above, even when alternating-current supplies are utilized for furnishing power for the output circuit and/or for heating the cathode. In accordance with one form of my invention, I achieve this object by balancing the effect of alternating heating current for the cathode against the effect of ripple in the output voltage of a rectifier supplying current to the output circuit; in accordance with other principles of my invention, I achieve the foregoing object by neutralizing the effect of ripple in voltage supplying the output of one or more three-electrode tubes in the system.

According to other forms of my invention, I neutralize the effects of alternating cathode-heating current, in tending to produce ripple in the output circuit of a three-electrode discharge-tube system by effects produced in the control electrode circuits.

In accordance with other principles of my invention, I avoid the production of harmonics in the output of a rectifier by effects produced on a control-electrode provided therein.

Certain of the considerations upon which the foregoing methods of avoiding ripple in the output current are based will now be explained. It may be shown that, where an electron-discharge tube has its plate circuit supplied from a source of invariable direct-current voltage and its cathode is heated by alternating current, there are, at least four factors which tend to produce, in the output circuit, ripples of the second harmonic frequency of the heating current; these factors are—

(1) "Voltage factor", i. e. the effect on current conduction to the anode of the alternating voltage-drop between terminals of the cathode.

(2) "Magnetic factor", i. e. the effect on current conduction to the anode of the alternating magnetic field due to the cathode-heating current.

(3) "Diversion factor", i. e. a tendency of electrons from that end of the cathode which is negative at any particular instant to be diverted from the anode to the positive end of the cathode.

(4) "Temperature factor", i. e. the effect on anode current of the variation in cathode electron-emission consequent upon periodic variations of cathode temperature as heating current increases and decreases in course of its alternating-current cycle.

The relative magnitudes and phases of the harmonics due to these four factors depend upon the physical propositions of the tube system and, hence, may be varied by design. It is possible, thus, to make the two factors last named negligible relative to the first two; and, for the sake of simplicity, it will be considered herein that such is the case, and the effect of the first two factors will be considered.

Analysis shows that the voltage factor tends to produce a harmonic having its positive maximum coincident, in time, with the maximum of the heating current, as indicated by the full-line sine curve 1 in Fig. 1; while the harmonic due to the magnetic factor has its negative maximum coincident in time with the heating-current maximum, as indicated by the broken sine curve 2, in Fig. 1. In other words, the voltage and the magnetic factor produce opposite effects; and, by proper design, can also be made equal in magnitude, thus causing them to neutralize each other, when so desired. Likewise, by design, either may be made dominant in effect.

The full-line sine curve 3, in Fig. 1, represents the fundamental-frequency heating current.

Analysis also shows that any other alternating field set up across the paths traversed by electrons in passing from cathode to anode, tends to produce a similar second harmonic ripple in the output current to that attributed in the foregoing to the cathode-heating current. The "magnetic factor" may, accordingly, be increased or decreased by setting up magnetic fields in the electron tubes through the agency of external windings.

It may be shown that the principal harmonic in output voltage of a full wave rectifier is a second harmonic of the frequency of the alternating-current supply; and that this second harmonic is the one which it is most difficult and expensive to eliminate by means of ordinary filters. It also appears that the positive maxima of these harmonics coincide in time with the maximum of the supply voltage; in other words, that these harmonics are co-phasal with those due to the voltage factor described above. They may, accordingly, be neutralized by a predominant magnetic factor of proper amount; or by externally impressed alternating magnetic fields; or by other means which are adapted to neutralize the effect of the "voltage factor".

It is well known that a voltage impressed between the grid and the cathode of an electron tube has the same effect on the output current as would a voltage of a certain greater magniture impressed on the output circuit. In consequence, the tendency of harmonic currents of any frequency to flow in the output circuit as a result of any factor or cause, such as those pointed out above, may be neutralized by impressing voltage of the same harmonic frequency and proper phase and magnitude on the grid (input) circuit.

Arrangements for deriving, from an alternating-current supply, second harmonic voltage, or, in fact, any other harmonic, are known in the art, saturated magnetic-core devices, such as the Joly frequency changer, being one example; and these may be utilized to obtain voltages of the desired harmonic frequency to impress upon the output or input circuit, as above mentioned. Rectifier output-circuits are also potential sources of second and other harmonics voltages for this purpose; and, as also will be shown, a cold electrode, in the same container as a hot cathode traversed by alternating current, can be made to draw harmonic currents suitable for this purpose.

With the foregoing principles in mind, other objects of my invention will be apparent upon reading the following specifications, in connection with the appended drawing in which—

Figure 1 is an explanatory diagram;

Fig. 2 is a schematic diagram of an amplifier system embodying various features of my invention;

Fig. 3 is a schematic diagram of a rectifier embodying certain principles of my invention;

Fig. 4 is a schematic diagram of an amplifier system embodying certain other principles of my invention;

Fig. 5 is a schematic diagram of a particular arrangement adapted to derive harmonic voltage for employment in connection with my invention.

Referring, in detail, to Fig. 2, which is intended to show one typical circuit arrangement to which my invention is applicable, the reference numeral "4" denotes a three-electrode electrical-discharge tube having an anode 5, a control-electrode 6 and a cathode 7. The cathode 7 may be a filament, heated, preferably, through the agency of a transformer 8, by current from the alternating-current supply circuit 9, which may be of ordinary commercial lighting frequency. While I here describe the cathode as a filament traversed by the heating current, the principles of my invention, insofar as they concern the "magnetic factor" in ripple production, are applicable to independently heated unpotential cathodes; and, where the heaters for unpotential cathodes are not completely closed in from the space containing the anodes and control electrodes, the principles relating to "voltage factors" are likewise applicable.

The anode 5, is supplied with current, through the primary 11 of an output transformer, from a source of unidirectional voltage, which is here shown as a potentiometer 12 traversed by rectifier current; but it will be obvious to those skilled in that art that certain principles of my invention are applicable when the source 12 is a battery or other source of invariable unidirectional voltage. The control electrode 6 is connected to the cathode 7, through a tap, to the potentiometer 12, thus giving electrode 6 a negative bias; but any other means, such as a "C" battery, may be employed to provide the desired bias for electrode 6, if desired. The anode and control-electrode circuits connect with the cathode 7 through a tap 13 so positioned as to be at the mid-potential of the cathode. In circuit between cathode 7 and control-electrode 6, is the secondary 14 of an input transformer, which carries a signal or other current to be amplified, and the secondary 15 of a transformer the primary of which is fed from a frequency changer 17, which is fed, in turn, from the supply line 9. It may sometimes be desired to intercalate phase-modifying means of known type, such as condenser 18, in the circuit of frequency changer 17.

The frequency changer 17 may be of any one of several known types such, for example, as those described on pages 609 to 619 of Morecrafts' "Principles of Radio Communication", 1921 edition, Wiley & Sons, New York, publisher.

As stated in the foregoing explanation, the "voltage factor" and the "magnetic factor", due to the alternating current in the cathode of each, tend to produce second harmonic currents in the output circuit 11, but these effects are opposite in phase and may be made to neutralize each other by properly proportioning their respective magnitudes. It is possible, in fact, to calculate the magnitude of each for a given tube, and analysis shows that balance between the two requires a certain ratio of cathode voltage to current; that is to say, a certain cathode resistance.

It is usually necessary to design a cathode to give a certain anode current, and, hence, to yield a certain total electron emission. The negligible value requires that the heat-content of the cathode shall be great enough to prevent material decrease of electron emission while the heating current is near zero during the alternating-current cycle; in other words, the ratio of surface to mass of the cathode must not be too great. For a given geometrical form (a spherical cathode would be the optimum form, were this the only consideration) the ratio of the surface to mass decreases as the cathode diameter increases; hence, the cathode diameter and surface must be above a certain lower limit. This requirement fixes a maximum limit for specific electron emissivity of the cathode.

On the other hand, it can be shown that the balance point for "voltage factor" against "magnetic factors" depends upon the magnitude of the anode-circuit and grid-circuit voltages; and accidental variation of these must always be expected in practice. Analysis also shows that the magnitude of the harmonics resulting from unbalance due to a given percentage variation of grid or anode-circuit voltage is less as the total power input to heat the cathode is less. Hence, the power input to yield the desired electron emission should be minimized, as far as possible; that is to say, the cathode should be chosen, as regards material and operating temperature, to produce the above mentioned maximum limit electron emissivity and the minimum heat emissivity. This means that a given cathode material should operate as close to the temperature corresponding to the above mentioned maximum limit of electron emissivity as is consistent with obtaining good life; and, as between two different cathode materials so operated, that one which then has the lower operating temperature should be chosen.

As above stated, "temperature factor" may impose a limit on cathode dimensions, and balance of "voltage factor" against "magnetic factor" demands a certain value of resistance for the cathode. This means that the specific resistivity of the cathode filament may be fixed. It is, accordingly, desirable that the cathode should have the form of an alloy heater-base surfaced with electron-emissive materials; since the specific resistivity of the alloy base can be fixed at the required value by determining its composition independently of the character of its electron-emissive coating. Base filaments of certain alloys and having electron-emissive coatings, such as barium and strontium oxides have hitherto been utilized in electron tubes; but the character of the alloy was not determined by the foregoing considerations.

Since many metals have considerable temperature coefficients of resistance, accidental variation of the heater supply voltage would result when such metals were employed for base filaments, in variance from the value of cathode resistance, to produce the balance which avoids ripple, hence, it is desirable that the cathode-heater base be a material of nearly zero temperature coefficient. For this further reason, alloy bases, which alone can be given such temperature coefficients, are desirable. There will, accordingly, be a distinct advantage attained if alloy base filaments having emissive surfaces are employed as cathodes.

The foregoing described methods by which tubes provided with alternating-current cathode heating can be made to operate without ripple in their output circuits are feasible, provided no other causes of such ripple than the cathodes are present. Where the anode, control-electrode and loud-speaker-circuit-supply voltages are absolutely constant, this condition is approximated. However, it is frequently cheaper to use rectified voltages for these circuits which are not so elaborately and perfectly filtered as to meet this requirement; and it is to certain such cases that the frequency-changer 17, of Fig. 2 is applicable.

Let it be supposed that the potentiometer 12, of Fig. 2, is traversed by a current containing a harmonic frequency of the current supplied by sources 9; a voltage of this harmonic frequency is present in the voltage impressed on the circuits of anode 5 and/or the control-electrode 6. The frequency changer 17 may be adjusted to derive a voltage of the same harmonic frequency from source 9 and to impress it on the control-electrode 6. If this last named harmonic voltage is adjusted to proper magnitude and phase it will produce an effect in the output circuit 11 exactly equal and opposite to the harmonic in the source 12, with the result that no harmonic current whatever will flow through said output circuit.

In particular, if the current in the potentiometer 12 is supplied by a full-wave rectifier from the source 9, the principal harmonic in source 12 will be the second harmonic indicated by curve 1 of Fig. 1, and the voltage supplied by frequency-changer 17 and phase modifier 18 to control electrode 6 should be of the harmonic and phase represented by curve 2 of Fig. 1, as will be apparent to those skilled in the art.

It will also be evident that, since a lack of balance between the "voltage factor" and "magnetic factor" in cathode 7 produces effects of second harmonic frequency and phase indicated by either curve 1 or curve 2 in Fig. 1, the frequency-changer 17 and phase modifier 18 may be made to impress voltage on the control-electrode 6 capable of neutralizing such unbalance effect. Even though the four factors, described above as tending to produce ripple, cooperate to produce second harmonic effects of any phase, these alone, or in conjunction with second harmonic effects emanating from source 12, can be neutralized by a second harmonic voltage of proper magnitude and phase impressed on control-electrode 6 by frequency-changer 17 and phase-modifier 18.

It will also be evident that, in the usual case where the source 12 impresses a harmonic corresponding curve of Fig. 1, on the anode 5, it may be neutralized by employing a tube designed so that the "magnetic factor" corresponding to curve 2 of Fig. 1 predominates over the "voltage factor" in the right amount.

Analysis also shows that any magnetic field of the fundamental alternating frequency crossing the electron path between the cathode and the anode produces an effect corresponding to curve 2 of Fig. 1, and such an auxiliary field may be employed for all the balancing purposes to which curve 2 is described as applicable. Fig. 4 shows tubes arranged with windings suitable for setting up such magnetic fields, as will be described at greater length below.

Referring again to Fig. 2, the tube 4 may be one member of a cascade of amplifiers, oscillators or detectors, and the various factors tending to ripple production, and the principles and devices for neutralization are applicable in the case of each. Thus, 21 may denote an audio-frequency amplifier, say, in such a cascade, having an anode 22 drawing current from a source, such as 12, through the primary 23 of an output transformer in the secondary of which is connected a winding 24 of a reproducer 25. The reproducer 25 may be provided with a cooperating winding 26 drawing current from some direct-current source; for instance, source 12. Tube 21 is likewise provided with a control-electrode 27 and a cathode 28, the latter being supplied with heating current, if desired, from source 9. The connections of tube 21 are similar to those described for tube 4, and similar principles apply to the production and neutralization of ripple in the output circuit 23, except that, if ripple is not eliminated from the output of the immediately preceding tube of the cascade, the proportioning of the magnitude of the voltage and the magnetic factors and means of neutralization, and/or the adjustment of the voltage impressed on the circuit of electrode 27 by frequency-changer 17 and independently adjustable phase-modifier 29 and transformer 31, may be made to take care of the harmonic effects of the input voltage along with the remaining factors producing harmonics.

The consequence of the consideration last named is that harmonic effects need not be eliminated in each tube in cascade individually but the adjustments may be made at any point in the chain to produce neutralization of the net effect of all factors in the output of the final tube, where such is desired. It will then, in general, not be necessary to provide the above-described neutralizing means at any point in the system where it is not desired to eliminate harmonics; for example, the frequency-changer and the phase modifier may be linked to the grid of only the final tube of the cascade for most purposes.

If the winding of 26 of the reproducer 25 is supplied from a source, such as 12, having a harmonic, it may be desirable not to have the current in circuit 23—24 completely free from harmonics, but to have it contain a harmonic of the same frequency but of the opposite phase to that in winding 26. Thus, in the arrangement of Fig. 2, winding 26 would normally carry a harmonic corresponding to curve No. 1 of Fig. 1; and it might be desirable to cause, by any of the expedients outlined above for doing so, the flow of a harmonic corresponding to curve 2 of Fig. 1, in the windings 23, 24.

It will also be understood that the effect of the harmonic in the input circuit can be made to change through 180 degrees by reversing the transformer windings, although a signal will still be carried through the system in either connection. However, whether the input harmonic effect has the phase of curve 1 of Fig. 1, or of curve 2, of Fig. 1, it may, in any event, be neutralized by having either the "magnetic factor" or the "voltage factor plus the effect of source 12" predominate over the other, as may be required. The polarity of the intertube transformer windings may thus be made as desired to meet other conditions, the ripple being eliminated by filament design.

Referring further to Fig. 2, it shows, as a source of current for the potentiometer 12, a full-wave rectifier 32 fed, through transformer 33, from the source 9. The connections of its anode 34, is standard, and the potentiometer 12 is supplied with current through a filter comprising inductor 35 and capacitors 36 and 37. The cathode 38 may be supplied from source 9, if desired, its connections being similar to those of tube 4.

As pointed out above, there is normally present in the output of a full-wave rectifier, such as 32, a second harmonic corresponding to curve 1 of Fig. 2. If the "magnetic factor" of filament 38 is made predominant over the "voltage factor", it will tend to neutralize this second harmonic just mentioned. Another way of neutralizing it, however, is to connect in series with the condenser 37, which bridges the rectifier output, a transformer primary 39 which is linked with a secondary 41, connected between cathode 38 and control electrode 42 in tube 32. The transformer winding 41 may be adjusted to so impress a voltage of the right magnitude and phase on the control electrode 42 that no harmonic ripple appears in the current in potentiometer 12; or, if desirable, only such an amount of ripple as may be desired there in accordance with the principles already outlined. Windings 41 and 43 may also be used instead of frequency-changer 17 to impress the second harmonic voltages on transformers 15 and 31.

Alternatively or conjunctively, frequency-changer 17 may impress a harmonic voltage, through a primary 43 and phase-modifier 41 linked with the circuit of control electrodes 42, upon the latter of proper magnitude and phase to wholly, or in any desired degree, eliminate harmonic ripple from the output of rectifier 32.

If the voltage supplies for the anode circuit and the control-electrode circuit of a tube, such as 4, are from the same rectifier output, as is the case in Fig. 2, there is a second harmonic in the control-electrode voltage of such phase that it automatically tends to oppose the effect of the harmonic in the anode-circuit voltage. If the control-electrode voltage is so adjusted that its harmonic is $1/m$ times the anode-circuit voltage, where $m$ is the amplification factor of the tube, the two harmonics will balance their effects on the output circuit, and the output current will be devoid of ripple. Such an operation of tubes from a rectifier output potentiometer is, accordingly, one way of minimizing or completely avoiding ripple in the output current.

Negative-resistance elements of known type may, if desired, be inserted in series with the winding 39 or the winding 41 to neutralize the effect of the resistance, otherwise inherent in their circuits.

Since externally-induced magnetic fields of fundamental alternating-current frequency produce effects corresponding to curve 2 of Fig. 1, they may be employed to supplement the "magnetic factor" in all cases above mentioned. Thus, in Fig. 3, a three-electrode tube 51, corresponding to tube 4 or to tube 21 in Fig. 2, is provided with a magnetizing winding 52, which may conveniently be coaxial with its electrodes, and which is supplied with a properly regulated amount of current from source 9 to give a second harmonic effect in the output circuit of the amount and phase needed to neutralize the effect of filament-heating current and/or ripple voltage-source 54. Phase modifier means, such as 55, for the current in winding 52 may be provided when desirable.

Reference numeral 56 denotes a full-wave rectifier somewhat like tube 32 of Fig. 2. A winding 57, fed from source 9 through variable impedance 58, is provided to neutralize the second harmonic in the output to potentiometer 54 in the same way as the predominant "magnetic factor" is described as doing in a preceding paragraph. Other reference numerals in Fig. 3 denote elements similar to those so designated in Fig. 2.

The second harmonic voltage directly at the terminals of a full-wave rectifier is relatively large, and the size and elaborateness of the filters and other corrective arrangements shown in Fig. 2 may be reduced if a polyphase rectifier, such as a two-phase rectifier or the three-phase rectifier shown in Fig. 4, be employed. Thus 61 is a tube containing three anodes 62, three control electrodes 63 and a cathode 64 which may, if desired, be heated by alternating current from source 9. The "voltage factor" and "magnetic factor", due to cathode 64, may be balanced. Current is supplied to the anodes 62 from a phase-splitting network of known type comprising capacitors 65 and inductor 67 of the supply transformer. The common terminal of three impedances 68 corresponds to the neutral of transformer winding 13 in Fig. 2; while point 13 in Fig. 4 corresponds to point 13 in Fig. 2. A frequency-multiplier is arranged to so provide three third-harmonic voltages of proper phase and magnitude that, when respectively impressed upon the circuits of control-electrodes 63, the third harmonic ripple, otherwise present in the output voltage of the rectifier, is suppressed. For a two-phase rectifier, a frequency-multiplier giving two voltages ninety degrees different in phase would be provided to impress voltage on the control-grids; and so on.

Fig. 5, shows a particular device for deriving second harmonic voltages. A tube 71, which may correspond to tube 21 or to tube 32 of Fig. 2, has an anode 5, a control-electrode 6 and a cathode 7 supplied with heating current from alternating-current source 9, as in Fig. 2. The tube 71 also contains auxiliary electrode 72, which may be connected to one terminal of a battery 73, when desired, through the primary 74 of a transformer 75.

The secondary of the transformer 75 is provided with phase-modifying means 76 (when desired) and intercalated in the circuit of the control-electrode 6. The winding 74 will be found to carry a current of second harmonic frequency and phase corresponding to curve I of Fig. 1; and the voltage of the secondary winding may be made to serve the same purposes as does the output of frequency changer 17 in Fig. 2.

In accordance with the patent statutes, I have described a particular embodiment of my invention, but it will be evident to those skilled in the art that the principles thereof are of broader application and many different ways of embodying them will be readily apparent. I, accordingly, desire that the following claims shall be given the broadest interpretation of which their terms are susceptible in view of the limitations imposed by the prior art.

What I claim is:

1. The method of minimizing harmonics in the output of a rectifier provided with a control electrode and fed from an alternating-current source which includes the step of impressing on a control-electrode therein one or more similar harmonics derived from a circuit in shunt relation to the output circuit of said rectifier.

2. The method of eliminating ripple from the output-current of a triode having a cathode heated by alternating current and an anode circuit fed from the output of a rectifier which comprises so designing said cathode that its "magnetic factor" exceeds its "voltage factor."

3. The method of eliminating ripple from the output-circuit of a triode having a cathode heated by alternating current and a anode-circuit voltage source including the output-circuit of a rectifier, and also having an input-voltage comprising a harmonic of said alternating current which comprises so designing said cathode that the effect on the anode circuit of the "magnetic factor" plus the effect of the "voltage factor" thereon neutralizes the effect on said anode circuit of the harmonics in its control-electrode circuit plus the effect thereon of the harmonics in said rectifier-output.

4. The method of minimizing the effect of harmonics of the supply frequency in the output of a rectifier having a cathode heated by current from said supply which comprises so designing said cathode that the "magnetic factor" exceeds the "voltage factor."

5. The method of neutralizing the effect of harmonics of the supply frequency in the output of a rectifier feeding current to a winding of a sound-producing device which includes the step of controlling power flow to said device by a hot-cathode tube having the "magnetic factor" of its heating current predominant over the "voltage factor".

6. In combination with a source of alternating current, an electron tube having a cathode heated by said source and comprising a material having substantially zero temperature-coefficient of resistance.

7. In combination with a rectifier drawing current from an alternating current supply and an energy translating device drawing power from said rectifier, a hot cathode tube traversed by the output current of said rectifier having a cathode heated by current of the same frequency as that supplied to said rectifier, the "magnetic factor" of said cathode being predominant over its "voltage factor".

8. In combination with an alternating-current supply and a rectifier deriving energy therefrom, a control electrode in said rectifier, means for deriving a harmonic voltage of said supply and means for impressing between said control electrode and the cathode of said rectifier a component of said harmonic voltage adjustable as to phase.

9. In combination with an alternating-current supply, a rectifier connected thereto including an anode and a cathode heated by current from said supply, said cathode having a "magnetic factor" which exceeds its "voltage factor".

10. In combination with an alternating-current supply, a rectifier drawing current therefrom, and a triode drawing its plate current from said rectifier and having a cathode heated by alternating current from said supply and a control electrode upon which is impressed an input voltage comprising a harmonic of the frequency of said supply, the sum of the effects on said plate current of the "magnetic factor" and the "voltage factor" of said cathode being of such magnitude as substantially to neutralize the effect of the harmonics in said control-electrode circuit plus the effect of the harmonics in the output of said rectifier.

11. In combination with an alternating-current supply and a rectifier drawing current therefrom, a triode having its plate supplied from said rectifier and a cathode heated by alternating current from said supply, said cathode having a "magnetic factor" which exceeds its "voltage factor".

12. In combination with an alternating current supply, a rectifier deriving energy therefrom, a filter for the output of said rectifier, a control electrode in said rectifier and adjustable means for impressing between said electrode and the cathode of said rectifier a harmonic voltage derived from an element of said filter.

13. In combination with an alternating current supply, a rectifier deriving energy therefrom, a filter for the output of said rectifier, a triode in the output of said rectifier, and means for deriving a harmonic voltage from an element of said filter and impressing it between the control electrode and one of the other electrodes of said triode.

14. In combination with an alternating current supply, a rectifier deriving energy therefrom, an energy translating device and a triode in series with the output circuit of said rectifier, and means for impressing a harmonic voltage of said alternating current supply between the control electrode and one of the other electrodes of said triode.

15. In combination with a hot cathode electrical discharge tube, a source of alternating current and an electrode in said tube heated by current from said source, the "magnetic factor" of said cathode and the "voltage factor" thereof being balanced to neutralize each other.

16. In combination with a hot cathode electrical discharge tube, a source of alternating current and an electrode in said tube heated by current from said source, the "magnetic factor" of said cathode and the "voltage factor" thereof being balanced so that second harmonics of the voltage of said alternating current source are neutralized in the output circuit of said tube.

FREDERICK W. LYLE.